(12) United States Patent
Cheng

(10) Patent No.: US 7,061,609 B2
(45) Date of Patent: Jun. 13, 2006

(54) MEASURING WAVELENGTH CHANGE

(75) Inventor: Lun Kai Cheng, Delft (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 194 days.

(21) Appl. No.: 10/275,119

(22) PCT Filed: May 1, 2001

(86) PCT No.: PCT/NL01/00327

§ 371 (c)(1),
(2), (4) Date: Feb. 27, 2003

(87) PCT Pub. No.: WO01/84097

PCT Pub. Date: Nov. 8, 2001

(65) Prior Publication Data

US 2003/0156287 A1 Aug. 21, 2003

(30) Foreign Application Priority Data

May 1, 2000 (WO) .................... PCT/NL00/00281

(51) Int. Cl.
*G01J 3/28* (2006.01)
(52) U.S. Cl. ...................................... 356/328; 356/326
(58) Field of Classification Search ........ 356/326–328, 356/402
See application file for complete search history.

(56) References Cited

U.S. PATENT DOCUMENTS

| | | | |
|---|---|---|---|
| 3,578,837 A * | 5/1971 | Brooks ................ 359/28 |
| 4,636,074 A * | 1/1987 | Levy et al. ............... 356/328 |
| 4,669,880 A | 6/1987 | Nelson et al. |
| 4,687,329 A * | 8/1987 | Schultz .................... 356/328 |
| 4,932,779 A * | 6/1990 | Keane ...................... 356/319 |
| 5,570,226 A * | 10/1996 | Ota ........................... 359/333 |
| 5,796,479 A | 8/1998 | Derickson et al. |
| 5,867,264 A * | 2/1999 | Hinnrichs ................ 356/310 |
| 5,933,235 A | 8/1999 | Sampei et al. |
| 6,144,025 A * | 11/2000 | Tei et al. .................. 250/226 |
| 6,154,551 A * | 11/2000 | Frenkel ................... 398/133 |
| 6,424,416 B1 * | 7/2002 | Gross et al. ............. 356/326 |
| 2002/0018203 A1* | 2/2002 | Battle et al. ............. 356/319 |
| 2003/0007147 A1* | 1/2003 | Johnson ................... 356/326 |

FOREIGN PATENT DOCUMENTS

EP 0 431 368 6/1991

* cited by examiner

Primary Examiner—Gregory J. Toatley, Jr.
Assistant Examiner—Kara Geisel
(74) Attorney, Agent, or Firm—Young & Thompson

(57) ABSTRACT

An optical wavelength analyser including: an entrance slit (4) for receiving a light beam (3) including signals with various wavelengths and passing the beam at least partly; a diffractor (6, 7, 9) for receiving the passed beam and diffracting the signals dependent on their wavelength; a detector (8) including adjacent detector elements (32, 33, 35, 36, 38, 39) for receiving the diffracted signals and generating their output signals; a processor (21) for determining the wavelengths from the output signals, in which the received light beam has a spatially uniform intensity; the diffractor diffracts each signal on a different detector element subset, consisting of at least a first element (32, 33, 35, 36, 38, 39.) for receiving at least a first signal with a first signal level; the processor determines each signal's wavelength dependent on the first signal level and a calibration value.

29 Claims, 7 Drawing Sheets

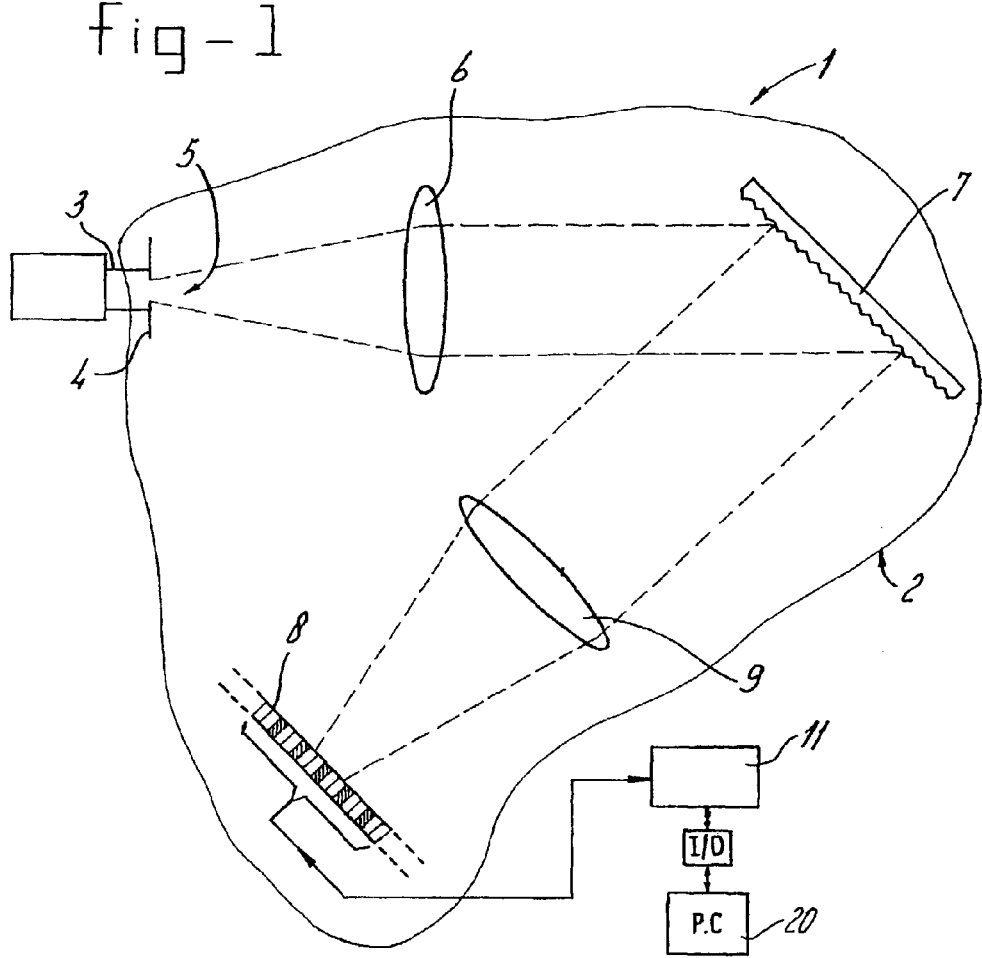
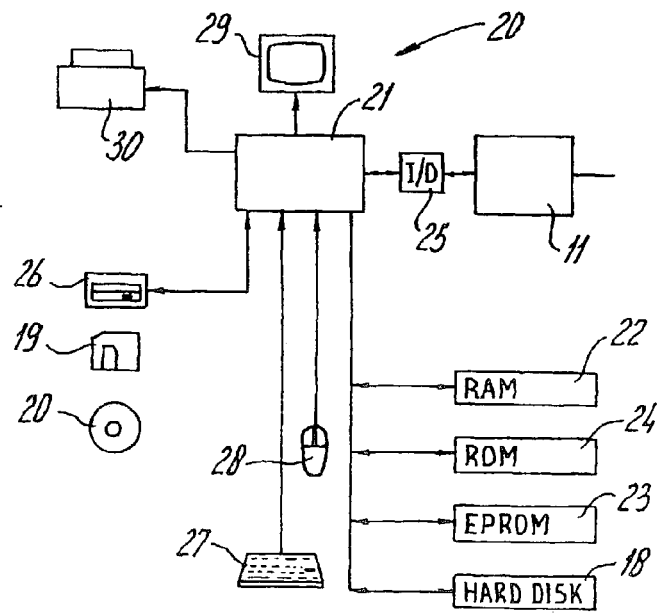

MEASURING WAVELENGTH CHANGE

FIELD OF THE INVENTION

The present invention relates to an optical wavelength analysis arrangement comprising:
- entrance selection means for receiving a light beam comprising one or more signals each with its own wavelength and passing at least part of the beam;
- diffractive means arranged to receive the at least part of the beam and to diffract each of the signals at an angle dependent on the wavelength;
- detector means comprising a plurality of detector elements arranged to receive the diffracted signals and to generate one or more detector output signals in dependence on the diffracted signals; and
- processing means connected to the detector means for receiving the detector output signals and determining the wavelength of each of the signals.

PRIOR ART

An arrangement as defined in the outset, is known from WO 99/09370, in which such an arrangement is described for usage in Fiber Bragg Grating (FBG) based, structure monitoring applications. In such applications, physical parameters like strain, temperature, pressure and others, are measured by a fiber network, containing a plurality of optical FBG sensors distributed over the structure. FBG sensors are capable of precise and absolute measurement of physical parameters as mentioned above. A FBG sensor installed in a fiber-optic network, reflects light signals that travel through the optical fiber, with a wavelength $\lambda$ that relates to the FBG periodicity $\Lambda$ as given by equation [1]:

$$\lambda = 2n\Lambda \quad [1],$$

where $\lambda$ is the wavelength of the light reflected by the FBG sensor, n is the effective index of refraction of the optical fiber, and $\Lambda$ is the periodicity of the FBG sensor, respectively.

Physical parameters that can be measured with FBGs, are related to the reflected wavelength due to the coupling of the physical parameters to the refractive index or the periodicity of the grating.

In structure monitoring applications, measurement of one or more specific physical parameters derived from a signal of an optical sensor in the fiber, is performed at a plurality of locations in the structure (e.g., a fuselage of an aircraft). To identify the origin of signals, each optical sensor generates a signal with a wavelength, specific for that sensor in that location. Thus, each wavelength corresponds to a location in the network. The signal wavelengths are well separated by intervals. The intervals are large enough to prevent overlap of sensor signals, when the response of a sensor changes due to change in a physical parameter, measured at the location of the sensor.

The light beam reflected by the sensors on the fiber network thus comprises a plurality of signals with different wavelengths has to be analysed by e.g., spectrometric means.

In many optical applications like FBG sensor networks, the wavelength of incident light is measured by a spectrometric arrangement with the purpose to determine a physical parameter related to the wavelength.

The method of spectrometry to determine the wavelength of light originated by the optical sensor, is well known. Light, gathered from a source (e.g., an optical sensor), is projected on a grating. Due to the wave characteristics of the light and the periodicity of the grating, the light is diffracted by the grating in one or more orders with their own direction as related to the wavelength(s) of the light, the angle of incidence, and the periodicity of the grating. By measurement of the angle of the diffraction direction(s) in the spectrometer, the wavelength of the light is determined. In spectrometers, as known in the art, the diffracted light is projected on a detector array (e.g., a linear or two-dimensional CCD system). In such an arrangement the position of the projected light on the detector is proportional to the wavelength of the light. The position of the projection is determined by fitting a mathematical model to the intensity data as measured by the detector's elements. The fitting procedure is needed here, since the spatial intensity distribution of the incident light beam that enters the spectrometer's slit is not uniform, because typically, the beam is focussed on the slit to collect as much optical power as possible. The spatial intensity profile of the projected light beam is usually described by a peak-shaped curve. To determine the centroid of the signal, a model describing the shape of the peak is fitted to the measured signal. Due to the non-linearity of the spatial intensity distribution, a useful fit can be accomplished only if a plurality of data points within the profile are measured. To obtain a reasonable accuracy with a resolution higher than the size of a detector element (a "pixel"), the spot projected on the detector array must cover a sufficiently large number of elements in the array, all of which must be sampled in the fitting procedure. Typically, a resolution of approximately $\frac{1}{10}$ pixel is possible on a range of 10 pixels.

For a measuring range, which is, for example, 50 times larger, the range on which the light beam is projected must be extended to 50 detector elements. Taking into account a cross-talk separation between signals of about 10 detector elements, in that case a range of more than 60 detector elements on the detector is needed for one signal. Usually, in a spectrometric application, many wavelengths are to be measured simultaneously, which requires that the spectrometer provides a sufficient large detector array. When, for example, 32 signals must be measured simultaneously, the detector array needs approximately 2000 elements.

In WO99/09370 a number of fiber channels each comprising a plurality of signals with different wavelengths are monitored by spectrometric means using a two-dimensional detector array on which the spectra of each fiber channel are projected on elongated regions of the array.

As known to those skilled in the art, in a such FBG sensor network, measurement of wavelengths of optical signals must be carried out at a rate, sufficiently efficient with respect to the number of FBG sensors in the network and the requirements for the type of application e.g., monitoring a structure by the FBG sensor network. By consequence of the method of fitting the peak shapes, a disadvantage of the arrangement of WO 99/09370 to obtain sub-element accuracy is, the rate at which data can be collected and calculated, especially, when high sample rates are required. From the paper of S. Chen et al., "Multiplexing of large-scale FBG arrays using a two-dimensional spectrometer", SPIE vol. 3330 (1999), p. 245–252, it can be found that with a projection of a signal from a light beam on a field of 7×7 detector elements a resolution of approximately $\frac{1}{56}$ of an element can be accomplished.

Due to the large amount of detector elements in an array, in such systems the overall sampling rate is in the order of only 25–100 Hz.

SUMMARY OF THE INVENTION

It is an object of the present invention to provide an arrangement and a method to improve the measurement of a signal and the processing of the signal by processing means, in order to determine the wavelength of the signal in a simple, efficient, and fast manner, with high accuracy.

This object is obtained in an optical wavelength analysis arrangement as defined in the outset characterised in that:
- the entrance selection means are arranged for outputting a beam with a spatial uniform intensity distribution;
- the diffractive means are arranged to diffract each of the signals such that each diffracted signal impinges on a different subset of detector elements, each subset comprising at least a first detector element for receiving at least a first signal portion with a first signal portion level;

the processing means are arranged to determine, for each subset the wavelength of the diffracted signal received in dependence on the first signal portion level and a calibration value.

With such an arrangement, the spatial intensity profile of a signal is already well known before detection. This implies that to determine the wavelength of the signal as measured by the detection means, the detection means needs a subset of at least one, at most two of detector elements to measure the signal. In case of a uniform distribution and a known constant optical power level of the light beam, only a single detector element, comprising part of the image of a signal, is sufficient. If however, the optical power level is unknown due to e.g. fluctuations, a subset of two adjacent detector elements, that comprise the complete image of a signal, will suffice to determine the wavelength. Due to the small number of detector elements to be sampled, the calculation of the wavelength of a signal in the arrangement of the present invention is strongly simplified. Accordingly, the computation time involved to measure the wavelength of a signal is strongly reduced.

Consequently, the measurement of wavelengths of a plurality of signals in the arrangement of the present invention requires less time than is known from the prior art. Also, since less detection elements are necessary to measure a signal, the detection means in this arrangement can have a smaller number of detection elements than is known from the prior art. Therefore, the total readout time for the detector array is also reduced.

The present invention also relates to a method of optical wavelength analysing comprising the steps of:
- receiving a light beam comprising one or more signals each with its own wavelength;
- diffracting each of the signals at an angle dependent on the wavelength;
- receiving the diffracted signals and generating one or more detector output signals in dependence on the diffracted signals by a plurality of detector elements;
- determining the wavelength of each of the signals from the detector output signals characterised by:
- the beam having a spatial uniform intensity distribution;
- diffracting each of the signals such that each diffracted signal impinges on a different subset of detector elements, each subset comprising at least a first detector element for receiving at least a first signal portion with a first signal portion level;
- determining, for each one of the subsets the wavelength of the signal received in dependence on the first signal portion level and a calibration value.

The present invention also relates to a computer arrangement comprising processor means and arranged to receive detector output signals from detector means comprising one or more subsets of detector elements, each subset having at least a first detector element for receiving a first signal portion with a first signal portion level of a signal derived from a beam with a spatial uniform intensity distribution, the arrangement being programmed to determine, for each one of the subsets the wavelength of the signal received in dependence on the first signal portion level and a calibration value.

Moreover, the invention relates to a computer program product to be loaded by a computer arrangement comprising processor means and arranged to receive detector output signals from detector means comprising one or more subsets of detector elements, each subset having at least a first detector element for receiving a first signal portion with a first signal portion level of a signal derived from a beam with a spatial uniform intensity distribution, the computer program product, after being loaded by the computer arrangement, providing the computer arrangement with the capability to determine, for each one of the subsets the wavelength of the signal received in dependence on the first signal portion level and a calibration value.

Furthermore, the present invention relates to an optical wavelength analyser comprising:
- an entrance selector with a slit for receiving a light beam comprising one or more signals each with its own wavelength and passing at least part of the beam;
- a diffractor to receive the at least part of the beam and to diffract each of the signals at an angle dependent on the wavelength;
- a detector comprising one or more pairs of adjacent detector elements arranged to receive the diffracted signals and to generate one or more detector output signals in dependence on the diffracted signals;
- a processor connected to the detector for receiving the detector output signals and determining the wavelength of each of the signals characterised in that:
- the entrance selector is arranged for receiving a beam with a spatial uniform intensity distribution;
- the diffractor is arranged to diffract each of the signals such that each diffracted signal impinges on a different subset of detector elements, each subset comprising at least a first detector element for receiving at least a first signal portion with a first signal portion level;

the processor is arranged to determine, for each subset the wavelength of the diffracted signal received in dependence on the first signal portion level and a calibration value.

Finally, the invention relates to a data carrier provided with a computer program product as defined above.

BRIEF DESCRIPTION OF THE DRAWINGS

Below, the invention will be explained with reference to some drawings, which are intended for illustration purposes only and not to limit the scope of protection as defined in the accompanying claims.

FIG. 1 shows a schematic overview of an arrangement in accordance with the present invention;

FIG. 2 shows a schematic overview of a computer arrangement related to this invention;

DETAILED DESCRIPTION OF PREFERRED EMBODIMENTS

Figure 3:
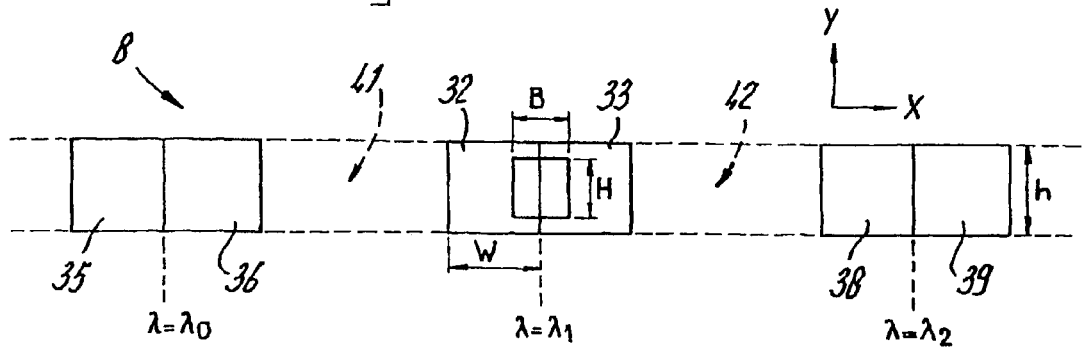
FIG. 3 shows a schematic drawing of a signal projected on detection means in accordance with a first preferred embodiment of the present invention.

The present invention relates to an arrangement and method of simple and fast measurement of a wavelength of a signal from an optical sensor, which may be an FBG sensor, or any other type of optical sensor as known in the art.

In the present invention the signal to be measured is adapted in such a way that the signal has a spatial uniform intensity distribution. The intensity uniformity of the signal simplifies measurement of the wavelength of such a signal. Also, computations relating to the wavelength of the measured signal are simplified by the spatial uniformity of the signal.

In FIG. 1 a schematic overview of an arrangement in accordance with the present invention is shown. In the arrangement 1, a spectrometer 2 is used to measure the wavelength of light signals from one or more optical sensors. Light comprising signals from one or more sensors is projected by, for example, a beam expander element, as a beam 3 on an entrance slit 4 of the spectrometer 2. From the light beam 3, a selection is made by the slit 4 to obtain a smaller beam 5 with a spatial uniform intensity. By means of a lens 6 at focal point distance from the slit 4, the beam is projected on a dispersive element like a grating 7. The grating 7 diffracts the beam at a diffraction angle relative to the incoming beam. The diffraction angle is dependent on the wavelength, the periodicity of the grating 7, and the incident angle of the beam on the grating 7. Thus, the beam is dispersed into its spectral components. The spectrum is projected on a detector 8, by a lens 9 at focal point distance from the detector. The detector 8, comprising sensor 10 and control electronics 11, is capable of measuring the optical power of the projected spectrum as a function of the position on the detector 8, in which the position is correlated to the wavelength of the light. The detector 8 may be a CCD sensor, a CMOS imager, or any other capable type of sensor as known in the art. Using this optical set-up, the projection of a monochromatic beam on the detector 8 is an image of the slit opening 4. In case the focal length of lens 6 is equal to that of lens 9, the image is a one to one image of the slit opening.

By means of the control electronics, the detector 8 is connected to a computer 20, which records the spectrum measured by the detector, and calculates the wavelengths of signals in the spectrum.

FIG. 2 shows a schematic overview of a computer arrangement 20 comprising processor means 21 with peripherals. The processor means 21 are connected to memory units 18, 22, 23, 24 which store instructions and data, an I/O connection 25 which connects the processor means 21 to the control electronics 11 of detector 8, one or more reading units 26 (to read, e.g., floppy disks 19, CD ROM's 20, DVD's, etc.), a keyboard 27 and a mouse 28 as input devices, and as output devices, a monitor 29 and a printer 30.

The memory units shown comprise RAM 22, (E)EPROM 23, ROM 24 and hard disk 18. However, it should be understood that there may be provided more and/or other memory units known to persons skilled in the art. Moreover, one or more of them may be physically located remote from the processor means 21, if required. The processor means 21 are shown as one box, however, they may comprise several processing units functioning in parallel or controlled by one main processor, that may be located remote from one another, as is known to persons skilled in the art. Moreover, other input/output devices than those shown (i.e., 27, 28, 29, 30) may be provided.

FIG. 3 shows a schematic drawing of a monochromatic signal projected on detector 8 in accordance with a first preferred embodiment of the present invention. The detector elements 32, 33, 35, 36, 38, 39, 41, 42 of the detector 8 are arranged in a row. The position of the center of the image of the slit for specific wavelengths $\lambda_0$, $\lambda_1$, $\lambda_2$ on the interfaces between detector elements 32, 33, and 35, 36 and 38, 39 respectively is indicated by dashed vertical lines. On the detector 8 a signal's image 31 of the slit opening 4 is projected by the optics of the spectrometer 2 as shown in FIG. 1.

The shape of the image 31 is conformal with the rectangular slit opening 4. By design of the projection system, the width B of the image 31 is smaller than the width W of one of the detector elements 32, 33. Thus, the image only partially covers both detector elements in the one (e.g., horizontal) direction as indicated by arrow X. The covered length on the elements 32, 33 is denoted as x32, x33 respectively. In the other perpendicular vertical direction as indicated by arrow Y, the height H of the image is also smaller than the detector element height h. However, the height H of the image may be larger than the detector element height h, thus covering a detector element completely in this direction.

By a calibration procedure as known in the art, the position of the detector elements is translated to a wavelength scale. By means of this calibration procedure the wavelength of a signal can be determined from the position of the signal's image on the detector elements 32, 33. In FIG. 3 a dashed line denotes the position of the center of the image of the slit for wavelength $\lambda_1$ the interface between elements 32 and 33. Other detector element pairs 35, 36 and 38, 39 with their respective wavelengths $\lambda_0$ and $\lambda_2$ are shown. In between the detector element pairs a spacing, for example by means of one or more unused detector elements 41, 42, is included, in order to prevent cross-talk of signals.

It is to be noted that in stead of unused detector elements 41, 42 an empty gap may be implemented in between the detector element pairs (32, 33), (35, 36) and (38, 39).

Figure 4A:
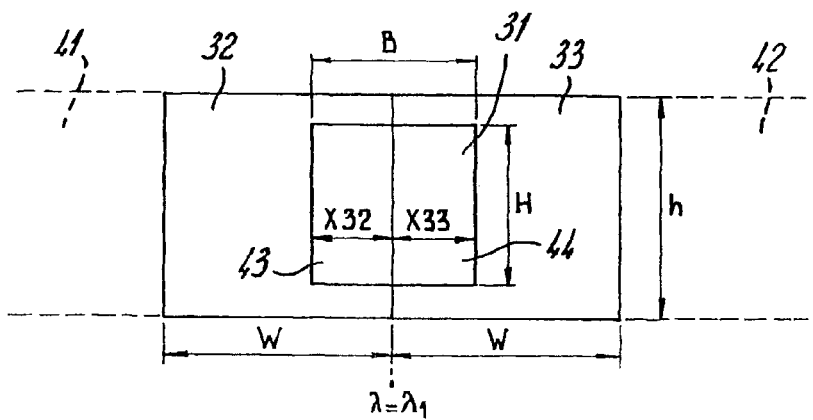
FIGS. 4a and 4b show an illustration of the method to calculate the position and wavelength of a signal, projected on the detection means, and their respective change, in an arrangement of the present invention.
Figure 4B:
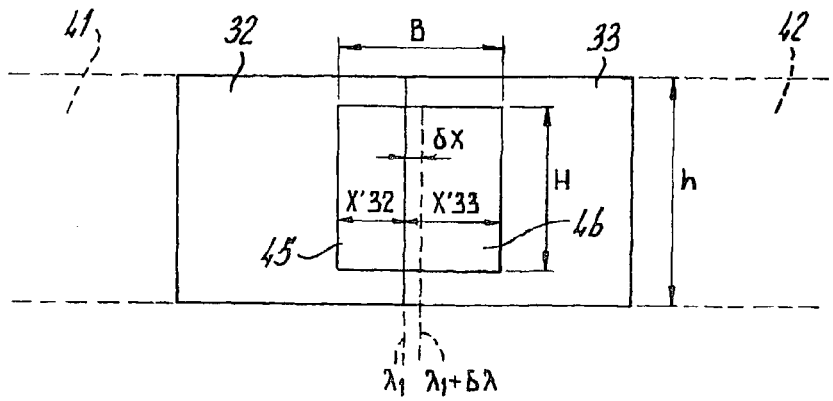

FIGS. 4a and 4b show an illustration of the method to calculate the position and wavelength of a signal, projected on detector 8, and their respective change, in an arrangement of the present invention.

In FIG. 4a as an example, the centreline of the image 31 is projected on the detector elements 32, 33 and coincides with the interface of the two detector elements.

If a spatial uniform intensity of the image is assumed, the optical power 43, 44 measured on a detector element 32, 33 will be proportional to the area H*x32, H*x33 covered on the element, which is directly proportional to the coverage in the direction X, since the coverage in the direction Y is constant.

The difference between the optical power 43, 44 is determined. In order to correct for fluctuations of the optical power of the beam, the difference is normalised by dividing by the sum of optical power 43 and 44.

In this case, the optical power 43, 44 measured is equal on each element, since x32 equals x33. The difference in optical power is zero, which indicates that the image is projected symmetrically on the detector elements, with the centre of the image at the interface between the two elements. Thus, the wavelength of the signal equals $\lambda_1$.

FIG. 4b shows the projection of image 31 on detector 8 for a signal with a wavelength that differs from $\lambda_1$ by an amount $\delta\lambda$.

Because the position of the image 31 on the detector 8 is directly proportional (as calibrated) to the wavelength of the projected image, a wavelength difference $\delta\lambda$ is directly proportional to a shift $\delta x$ of the image's centreline. The centreline of the image is projected shifted over a distance $\delta x$ with respect to the interface between the two elements 32, 33. Since the illuminated width x'32 is not equal to x'33, the normalised difference of optical power 45 and 46 measured on the respective detector elements 32, 33 and divided by the sum of the optical powers 45 and 46, is unequal to zero.

In this way, the wavelength of a signal can be measured advantageously, by determining the normalised difference of the optical power received by two adjacent detector elements. The measurement requires a limited number of detector elements and the calculation requires few and simple computations by processor means 21 with relatively short computation times.

Figure 5:
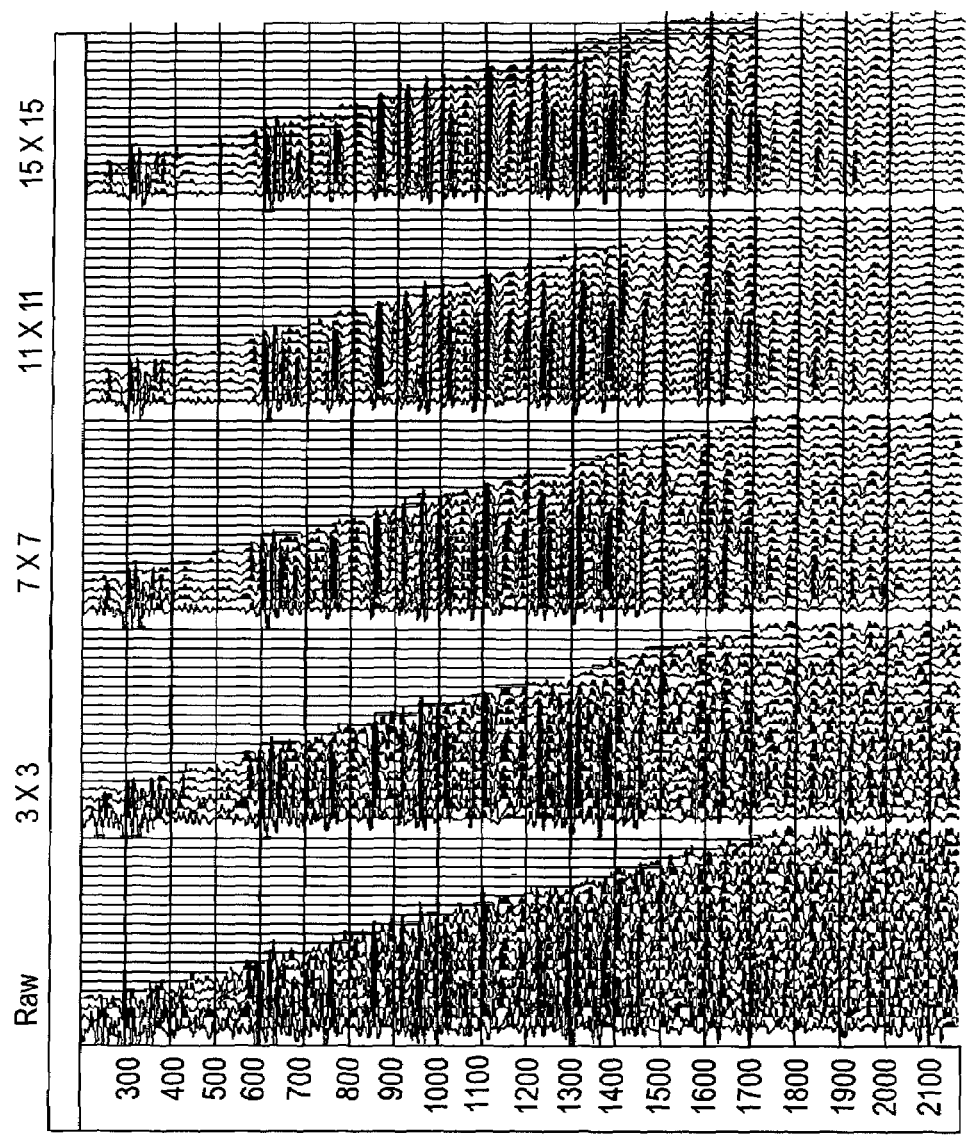
FIG. 5 shows a block diagram of a procedure in a computer program in accordance with the method as shown in FIGS. 4a and 4b.

In FIG. 5 a block diagram is shown of a method related to the present invention, to be carried out by the processor means 21, to determine the wavelength of a signal projected on a pair of detector elements, according to the measurement principle as shown in FIGS. 4a and 4b.

In step 51, the processor means 21 enter the procedure by a request to select two adjacent detector elements $E_j$, $E_{j+1}$ for measurement.

In steps 52 and 53, the computer addresses the control electronics 11 to read optical power $I(E_j)$, $I(E_{j+1})$ of elements $E_j$, $E_{j+1}$, and to transfer the data in a readable format to the computer.

In step 54, it is checked if a signal is present on the selected elements.

If light is measured, then results are calculated. Otherwise, the following steps 55–58 are skipped.

Step 55 calculates the optical power difference between the elements $E_j$, $E_{j+1}$, normalised by the sum of the optical power $I(E_j)$ and $I(E_{j+1})$ Step 56 calculates the corresponding shift $\delta x$ on the detector 8.

In step 57 the wavelength shift $\delta\lambda$ with respect to the wavelength $\lambda_1$ corresponding to the centreline between detector elements $E_j$, $E_{j+1}$ is calculated from shift $\delta x$ by using wavelength calibration data for the detector.

Step 58 calculates the measured wavelength by adding the wavelength shift $\delta\lambda$ to the wavelength $\lambda_1$, corresponding to the position of the detector elements centreline. This wavelength $\lambda_1$ is derived from the wavelength calibration data for the detector 8.

In step 59 the procedure ends. The processor means 21 return to the procedure where the request for step 51 originated from, with the value of the measured wavelength, or if no optical power was measured on the detector elements, with a predetermined value e.g., zero to signal this state.

Change of wavelength as a function of time can be measured by repeating the procedure as shown in FIG. 5, at given time intervals. In each measurement the wavelength of the signal is determined by the procedure of FIG. 5. The difference $\delta\lambda$ relative to the first measured value, as a function of time, can be calculated, stored, and processed further.

Figure 6:
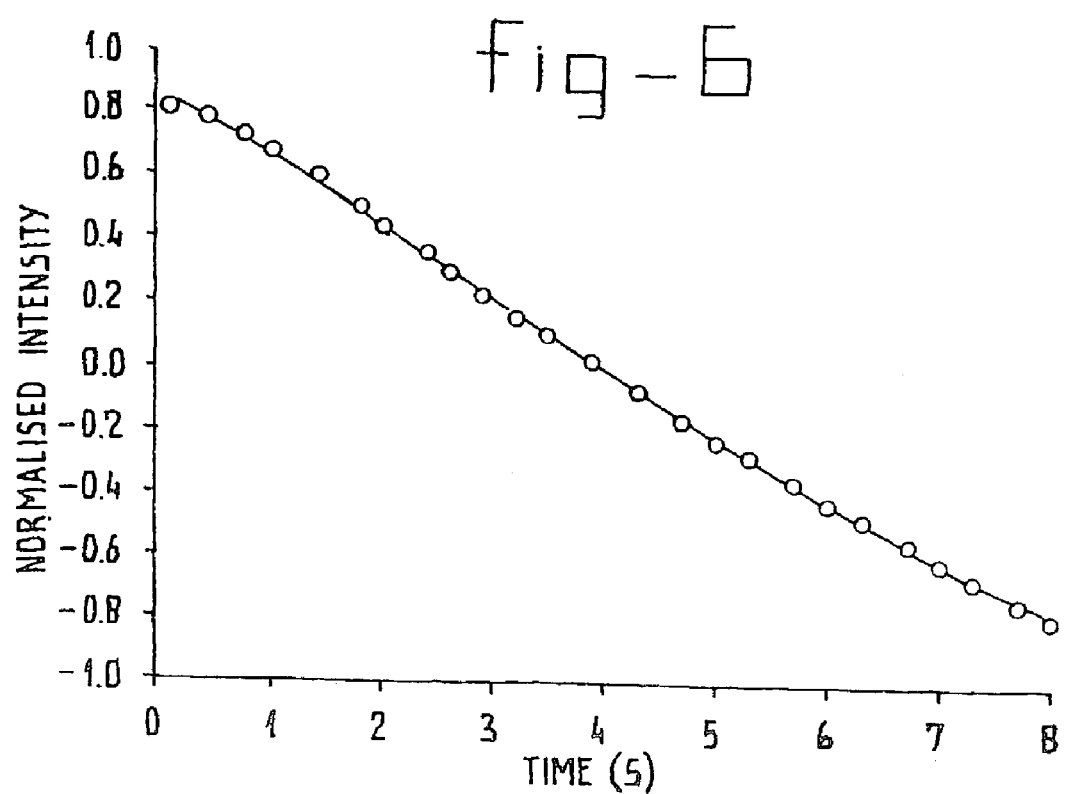
FIG. 6 shows exemplary results of a experiment, in which a change of wavelength of a signal, projected on the detection means, was measured as a function of time.

FIG. 6 shows the results of measuring the wavelength of a signal carried out in an arrangement of the present invention.

A monochromatic light source of which the wavelength changes directly proportional with time, is projected as a parallel beam on the slit opening 4 of the spectrometer. The intensity distribution of the light beam at the slit opening 4 has a spatial uniform intensity distribution. In FIG. 6 the normalised measured wavelength of the signal from the light source is shown as a function of time.

The sub-detector element accuracy in such arrangement depends on the signal to noise ratio of the detector elements. In this arrangement, using commercially available detectors an accuracy of 1/500 can be obtained, at an overall sampling rate in the order of a several kHz.

It should be understood that measuring wavelength change using a light beam with a spatial uniform intensity distribution can even be done by measurement of the diffracted signal on only a single detector element, without the use (or need) of a second detector element. As illustrated by FIG. 4a, a diffracted signal covers each of the detector elements in a pair just partially. Thus, when the diffracted signal shifts, due to a change of wavelength, the signal's coverage 31 on the detector element 32 will change from x32 to say x'32, and cause a change in the measured optical power on the detector element from measured optical power level 43 to measured level 45.

If the light beam 3 has an optical power level which is time invariant, i.e. the intensity of the beam does not change over time, no normalisation step is necessary and it will be sufficient to measure the optical power level of a diffracted signal impinging on a single detector element 32. In that case, the shift of the wavelength can be calculated from the difference of the measured optical power level on the single detector element 32 and the optical power level of a reference diffracted signal, which has been calibrated with respect to its location on the detector element 32. Such calibration procedures to obtain the latter optical power level are known to those versed in the art. In fact, in an embodiment for this type of measurement with a single detector element, the second element 33 in the detector element pair 32, 33 may even be omitted.

Therefore, depending on the application, it may be possible to have only one single detector element, or a few single detector elements set-up separately at various locations in the arrangement to measure wavelength(s).

Also, if the optical power level of the beam is monitored constantly, for example, by a separate detector, measurement on only a single detector element is sufficient to determine the wavelength of a diffracted signal. Here, the shift of the wavelength can be calculated from the quotient of the measured optical power level on the single detector element 32 and the optical power level of a reference signal, used for calibration. In such an embodiment, the optical power level of the reference signal is to be corrected by dividing by the actual optical power level of the diffracted signal.

Figure 7:
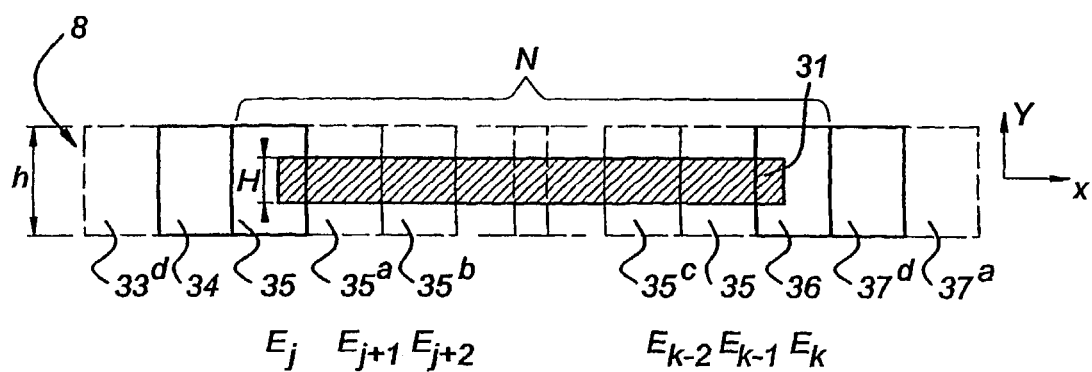
FIG. 7 shows a schematic drawing of a signal projected on detection means in accordance with a second preferred embodiment of the present invention.

FIG. 7 shows a schematic drawing of a signal projected on detection means in accordance with a second preferred embodiment of the present invention.

In FIG. 7, entities with the same reference numbers as used in preceding figures, refer to the same entities as shown in those figures. In this second preferred embodiment, the spatially uniform signal is projected as an image 31 on more than two detector elements of the detector 8. Still, in this embodiment the advantage of a significant simple and fast calculation scheme as presented above, can to a large extent be achieved here also.

The detector elements 33d, 34, 35, 35a, 35b, 35c, 35d, 36, 37, 37a, of the detector 8 are arranged in a row. On the detector 8 a signal's image 31 of the slit opening 4 is projected by the optics of the spectrometer 2 as shown in FIG. 1.

The shape of the image 31 is conformal with the rectangular slit opening 4. By design of the projection system, the height H of the image 31 is smaller than the height h of the detector elements 33d, 34, 35, 35a, 35b, 35c, 35d, 36, 37, 37a. Thus, in the one (e.g., horizontal) direction as indicated by arrow X, the image 31 covers a plurality of N detector elements 35, 35a, 35b, 35c, 35d, 36 of which the two exterior detector elements 35, 36 are only partially covered.

However, the height H of the image may be larger than the detector element height h, thus covering a detector element completely in this direction.

In this second preferred embodiment the center of the image 31 is determined by weighing of the signals received by the individual detector elements. By weighing, the "center of gravity" of the image intensity distribution can be calculated. The position of the "center of gravity" will depend on the actual intensity distribution. In case of a spatially uniform intensity distribution the result of weighing will be exactly the center position of the image 31.

Assuming the image 31 covers N detector elements $E_j \ldots E_k$ (35, 35a, 35b, 35c, 35d, 36) on the detector, each element $E_i$ within that range $E_j \ldots E_k$ measuring an intensity $I(E_i)$, the (horizontal) center position C of image 31 can be calculated by:

$$C = \frac{E_j * I(E_j) + E_{j+1} * I(E_{j+1}) + \cdots + E_{k-1} * I(E_{k-1}) + E_k * I(E_k)}{I(E_j) + I(E_{j+1}) + \cdots + I(E_{k-1}) + I(E_k)}$$

In case of a uniform intensity distribution of the light beam 3, the intensity I measured on the detector elements 35a, 35b, 35c, 35d (i.e., N−2 elements $E_{j+1} \ldots E_{k-1}$) will be identical for all detector elements $E_{j+1} \ldots E_{k-1}$. Only the intensity on the exterior two elements $E_j$, $E_k$ (35, 36) will depend on the actual coverage of respective element $E_j$, and $E_k$ by the image 31. The center position C can then be calculated by:

$$C = \frac{E_j * I(E_j) + (E_j + E_k) * \left(\frac{N-2}{2}\right) * I + E_k * I(E_k)}{I(E_j) + (N-2) * I + I(E_k)}$$

If the light beam 3 has an optical power level which is time invariant, the signals of the detector elements 35a, 35b, 35c, 35d will be identical for all these elements 35a, 35b, 35c, 35d and also constant over time. In that case, the term (N−2)*I is equal to a constant Q. The center position C can then be calculated by:

$$C = \frac{E_j * I(E_j) + (E_j + E_k) * \left(\frac{Q}{2}\right) + E_k * I(E_k)}{I(E_j) + Q + I(E_k)}$$

Using a calculation scheme according to one of the latter two equations, the center position C of the signal on the detector 8 can be obtained relatively simply.

Figure 8:
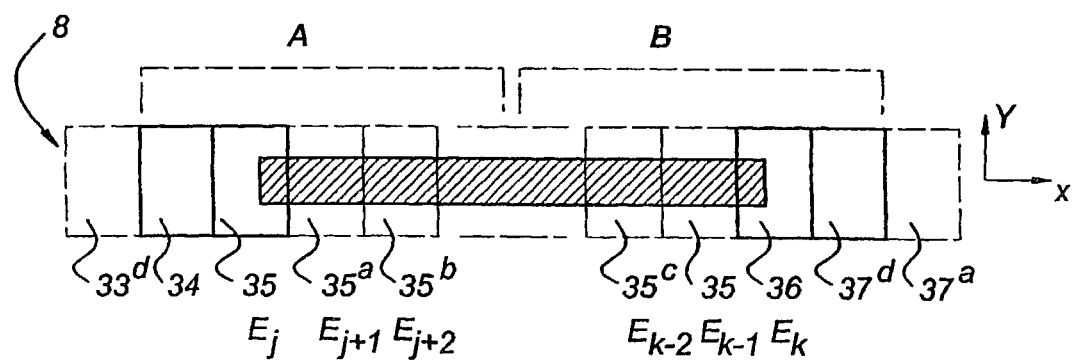
FIG. 8 shows a schematic drawing of a signal projected on detection means in accordance with a third preferred embodiment of the present invention.

FIG. 8 shows a schematic drawing of a signal projected on detection means in accordance with a third preferred embodiment of the present invention.

In FIG. 8, entities with the same reference numbers as used in preceding figures, refer to the same entities as shown in those figures. In this third embodiment, the detector elements 33d, 34, 35, 35a, 35b, 35c, 35d, 36, 37, 37a are grouped in two imaginary detector elements indicated as A and B.

The spatially uniform signal is projected as an image 31 on a plurality of N detector elements 35, 35a, 35b, 35c, 35d, 36 of the detector 8. The two exterior detector elements 35, 36 are only partially covered. The signal of the imaginary detector elements A and B is the sum of the intensities measured on the respective detector elements belonging to imaginary detector element A, and imaginary detector element B, respectively.

The calculation scheme as explained in FIGS. 4a and 4b for two detector elements, can be used in a similar way for determining the position and wavelength of the signal of image 31 by means of two imaginary detector elements A, B. Although, more detector elements need to be sampled in such a calculation, in this embodiment the advantage of a significant simple and relatively fast calculation scheme as presented above, can to a large extent be achieved here also.

Figure 9:
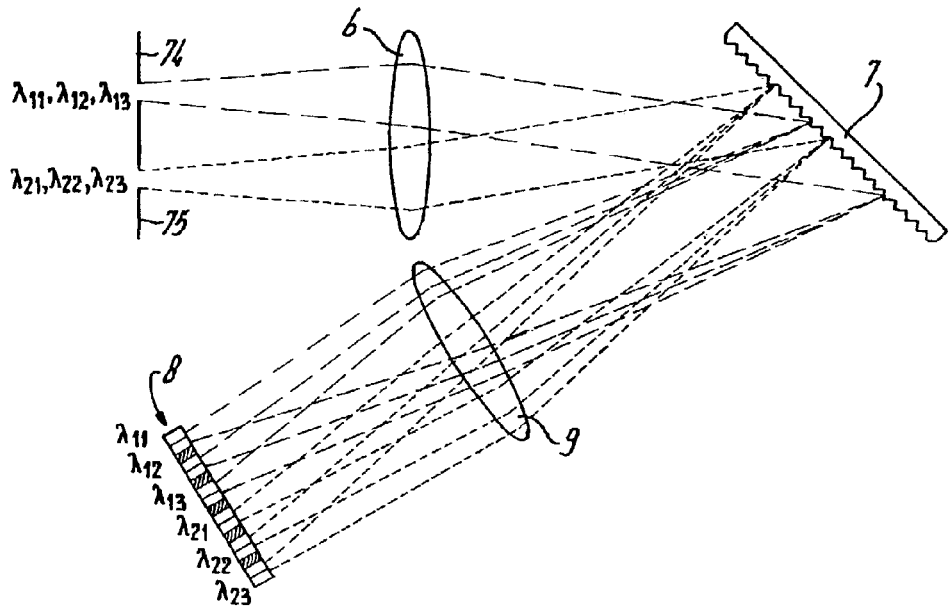
FIG. 9 shows an arrangement of the present invention, in which multiple sets of signals with different wavelengths, are measured simultaneously.

FIG. 9 shows an arrangement of the present invention in which multiple sets of signals are measured simultaneously. This arrangement illustrates the possibility of the present invention to provide means of de-multiplexing, an aspect essential to detection systems used in applications where a signal from one of a plurality of optical sensors needs to measured. In FIG. 9, entities with the same reference numbers as used in preceding figures, refer to the same entities as shown in those figures.

The arrangement as shown in FIG. 1 can be modified to extend the number of light sources that can be measured by replacing a single slit opening by two or more slit openings.

In FIG. 9, as an example, an arrangement is shown in which the slit opening 4 is replaced by two slit openings 74, 75 on the spectrometer. On each slit opening 74, 75 a broadband light source comprising multiple signals of different wavelengths (e.g., from a FBG array network) is projected. The light beam generated in each slit opening 74, 75 has a spatial uniform distribution. In a similar way to the embodiment shown in FIG. 1, each signal with its particular wavelength is projected on a pair of detector elements of a detector array 8. It is to be noted that due to the displacement of slit opening 75 with respect to slit opening 74, the optical path of light from slit opening 74 differs from that from slit opening 75. As illustrated in FIG. 9 this results in an additional separation of the signals originating from the respective slit openings 74, 75: on the detector 8 the spectrum from the light source at slit opening 74 is projected next to the spectrum from the light source at slit opening 75.

In the arrangement as shown in FIG. 9, de-multiplexing of a plurality of broadband light sources comprising multiple signals of different wavelengths can be performed on a one-dimensional detector array 8 according to one of the preferred embodiments as described above.

A plurality of spectra is projected adjacent to each other on the array. When properly calibrated, all spectra can be analysed simultaneously using the corresponding procedure for that particular embodiment.

Finally, FIGS. 10a–10d show arrangements of the present invention in which alternative optical means are utilised. In FIG. 10a–10d, entities with the same reference numbers as used in preceding figures, refer to the same entities as shown in those figures.

Figure 10A:
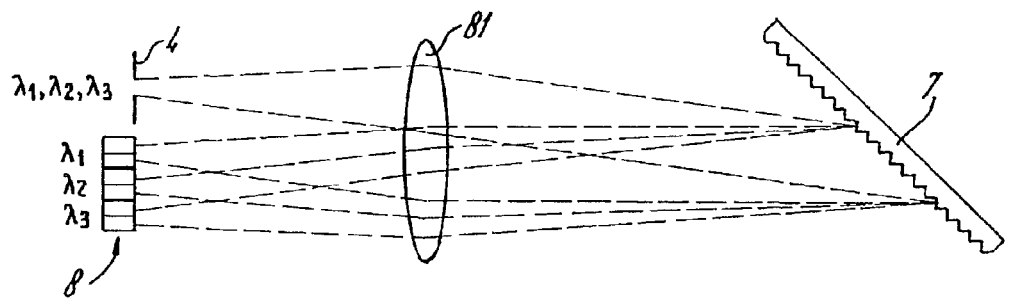
FIG. 10a shows an arrangement of the present invention, in which an alternative set-up of the diffractive means is applied.

FIG. 10a shows an arrangement of the present invention in which the lenses 6, 9 of the diffractive means are combined in a single lens 81.

Figure 10B:
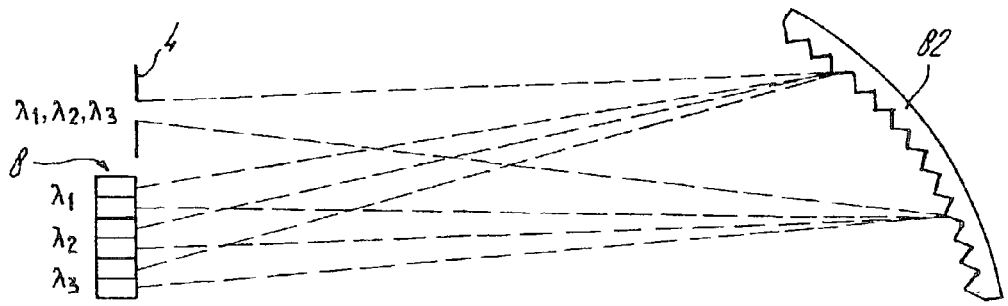
FIG. 10b shows an arrangement of the present invention, in which the diffractive means is combined into a single optical element.

As is known to those skilled in the art, the lens 81 may also be combined with dispersive means 7 into a single optical element as a concave grating 82 with the same functionality as defined by the diffractive means comprising separate projection means 6, 9 and dispersive means 7. The latter arrangement is shown in FIG. 10b.

Figure 10C:
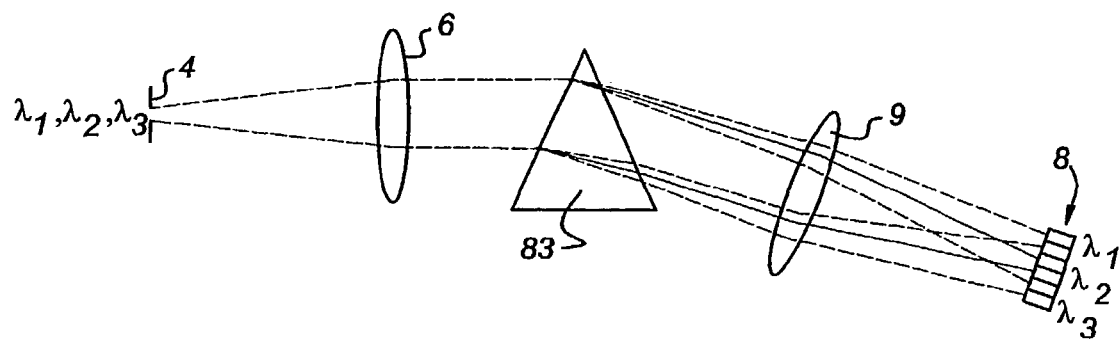
FIG. 10c shows an arrangement of the present invention, in which prismatic means are applied.

FIG. 10c shows an arrangement of the present invention, in which prismatic means is applied. Instead of a grating 7 as dispersive element, a prism 83 is used to redirect each signal in a direction depending on the wavelength $\lambda_1$, $\lambda_2$, $\lambda_3$ of the respective signal.

An unproved sensitivity can be achieved by replacing the grating 7 by a combination of two or more dispersive elements. An example of such an arrangement is shown in FIG. 10d.

Figure 10D:
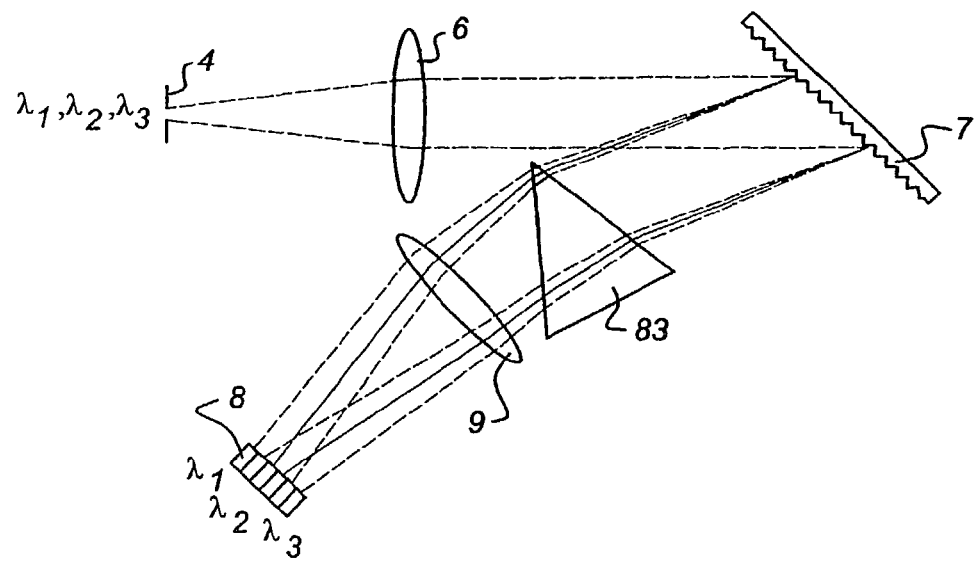
FIG. 10d shows an arrangement of the present invention, in which a combination of dispersive means are utilised.

FIG. 10d shows an arrangement of the present invention, in which a combination of dispersive means are utilised. A light beam encompassing a plurality of signals with wavelength $\lambda_1$, $\lambda_2$, $\lambda_3$, respectively, entering through the entrance slit 4 is projected by lens 6 on the grating 7. Here the light beam is diffracted in directions depending on the wavelength$\lambda_1$, $\lambda_2$, $\lambda_3$ of the respective signals. The diffracted beams are projected on a second dispersive element 83, e.g., a prism. The prism redirects each diffracted beam in a direction depending on its wavelength. By dispersing the incoming light beam by more than one dispersive element, a larger separation between individual signals can be achieved. Typically, by this arrangement a higher sensitivity of the instrument can be obtained.

It will be appreciated that other combinations of dispersive elements are possible with similar improved sensitivity.

Moreover, as known to persons skilled in the art, lenses 6, 9 may also be replaced by reflective optical elements, like concave mirrors (not shown), without changing the functionality of the optical wavelength analysis arrangement. It is also noted that in the present invention a holographic element may provide the same functionality as a prism or grating.

The invention claimed is:

1. Optical wavelength analysis arrangement comprising:
    entrance selection means (4) for receiving a light beam (3) comprising one or more signals each with its own wavelength and for passing at least part of said beam (3);
    diffractive means (6, 7, 9) arranged to receive said at least part of said beam (3) and to diffract each of said signals at an angle dependent on said wavelength;
    detector means (8) comprising a plurality of detector elements (32, 33, 35, 36, 38, 39) arranged to receive said diffracted signals and to generate one or more detector output signals in dependence on the diffracted signals;
    processing means (21) connected to said detector means for receiving said detector output signals and determining the wavelength of each of said signals
    characterised in that:
    said entrance selection means (4) are arranged for outputting a beam with a spatial uniform intensity distribution;
    said diffractive means (6, 7, 9) are arranged to diffract each of said signals such that each diffracted signal impinges on a different subset of detector elements, each subset comprising at least a first detector element (32; 33; 35; 36; 38; 39) for receiving at least a first signal portion with a first signal portion level;
    said processing means (21) are arranged to determine, for each subset the wavelength of the diffracted signal received in dependence on the first signal portion level and a calibration value.

2. Arrangement according to claim 1, wherein each subset comprises a second detector element adjacent to said first detector element, for receiving a second signal portion with a second signal portion level, and said processing means (21) are arranged to determine, for each subset, the wavelength of the diffracted signal received in dependence on the difference between said first and second signal portion levels.

3. Arrangement according to claim 2, wherein said processing means (21) are arranged to determine, for each one of said subsets of adjacent detector elements. (32, 33, 35, 36, 38, 39), the wavelength of the signal received in dependence on the difference between said first and second signal portion levels, the difference being divided by the sum of said first and second portion levels.

4. Arrangement according to claim 2, wherein each subset comprises one or more third detector elements (35a, 35b, 35c, 35d) in between said first detector element (35) and said second detector element (36), for receiving a third signal portion with a third signal portion level, and said processing means (21) are arranged to determine, for each subset, the wavelength of the diffracted signal received in dependence on the said first, second and third signal portion levels.

5. Arrangement according to claim 4, wherein said processing means (21) are arranged to determine, for each one of said subsets of said first, second and third detector elements, the wavelength of the signal received by calculation of the center of gravity of said first, second and third signal portion levels.

6. Arrangement according to claim 1, wherein the entrance selection means comprise a slit (4) and said diffractive means comprise a first lens (6) with a predetermined first focal distance and are arranged at a predetermined first distance equal to said first focal distance from said slit (4).

7. Arrangement according to claim 6, wherein said diffractive means further comprise a grating (7) as dispersive means arranged to receive an output beam from said first lens (6) and to generate said diffracted signals.

8. Arrangement according to claim 6, wherein said diffractive means further comprise a prism (83) as dispersive means arranged to receive an output beam from said first lens (6) and to generate said diffracted signals.

9. Arrangement according to claim 6, wherein said diffractive means further comprise a holographic element as dispersive means arranged to receive an output beam from said first lens (6) and to generate said diffracted signals.

10. Arrangement according to claim 6, wherein said diffractive means further comprise a combination of a grating (7) and a prism (83), or a combination of a grating (7) and a holographic element, as dispersive means arranged to receive an output beam from said first lens (6) and to generate said diffracted signals.

11. Arrangement according to claim 6, wherein said diffractive means further comprise a second lens (9) with a second focal distance, arranged to receive said diffracted signals from said dispersive means and arranged at a predetermined second distance from said detector means (8) equal to said second focal distance.

12. Arrangement according to claim 11, wherein said diffractive means comprise a single lens (81) which combines the functionality of said first lens (6) and of said second lens (9), said single lens (81) with a predetermined focal distance, being arranged at a predetermined distance equal to said focal distance from said slit (4), and said single lens (81) being arranged to receive diffracted signals from said dispersive means and at an equal distance from said detector means (8) equal to said focal distance,
and said dispersive means being arranged to receive an output beam from said lens (81) and to generate said diffracted signals.

13. Arrangement according to claim 11, wherein said diffractive means comprise an optical element (82) which combines the functionality of said first lens (6), of said dispersive means and of said second lens (9), said optical element (82) having a predetermined focal distance, said optical element (82) being arranged at a predetermined distance equal to said focal distance from said slit (4), being arranged to generate diffracted signals, and being arranged at equal distance from said detector means (8) equal to said focal distance.

14. Arrangement according to claim 1, wherein said detector means (8) comprise a detector element array, subsequent subsets of detector elements having at least one unused detector element (41,42) in between.

15. Arrangement according to claim 1, wherein said processor means (21) are arranged to determine a further physical parameter from said wavelength.

16. Arrangement according to claim 1, wherein said processor means (21) are arranged to monitor said detector output signals during a predetermined time period and to determine wavelength shifts during said time period as a function of time.

17. Arrangement according to claim 1, wherein said entrance selection means (4) are provided with a plurality of slits, each slit being arranged for receiving one of a plurality of different beams.

18. A method of optical wavelength analysing comprising the steps of:
receiving a light beam (3) comprising one or more signals each with its own wavelength;
diffracting each of said signals at an angle dependent on said wavelength;
receiving said diffracted signals and generating one or more detector output signals in dependence on the diffracted signals by a plurality of detector elements (32, 33, 35, 36, 38, 39);
determining the wavelength of each of said signals from said detector output signals characterised by:
said beam having a spatial uniform intensity distribution;
diffracting each of said signals such that each diffracted signal impinges on a different subset of detector elements, each subset comprising at least a first detector element (32; 33; 35; 36; 38; 39) for receiving at least a first signal portion with a first signal portion level;
determining, for each one of said subsets the wavelength of the signal received in dependence on said first signal portion level and a calibration value.

19. A method of optical wavelength analysing according to claim 18, further comprising the step of
diffracting each of said signals such that each diffracted signal impinges on a second detector element adjacent to said first detector element, for receiving a second signal portion with a second portion level;
determining, for said first and second detector element of said subset of detector elements (32, 33; 35, 36; 38, 39), the wavelength of the signal received in dependence on the difference between said first or second signal portion level.

20. A method of optical wavelength analysing according to claim 19, further comprising the step of determining, for a single first and second detector element of said subsets of detector elements (32, 33; 35, 36; 38, 39), the wavelength of the signal received in dependence on the difference between said first and second signal portion levels, the difference being divided by the sum of said first and second signal portion levels.

21. A method of optical wavelength analysing according to claim 19, further comprising the step of
diffracting each of said signals such that each diffracted signal impinges on one or more third detector element (35a, 35b, 35c, 35d) in between said first detector element (35) and said second detector element (36), for receiving a third signal portion with a third portion level;
determining, for said first, second and third detector elements of said subset of detector elements (32, 33; 35, 36; 38, 39), the wavelength of the signal received in dependence on said first, second and third signal portion levels.

22. A method of optical wavelength analysing according to claim 21, further comprising the step of determining, for said single first, second and third detector elements of said subsets of detector elements (34, 35 35, 36; 38, 39), the wavelength of the signal received by calculation of the center of gravity of said first, second, and third signal portion levels.

23. A computer arrangement comprising processor means (21) and arranged to receive detector output signals from detector means (8) comprising one or more subsets of detector elements (32, 33, 35, 36, 38, 39), each subset having at least a first detector element for receiving a first signal portion with a first signal portion level of a signal derived from a beam (3) with a spatial uniform intensity distribution, the arrangement being programmed to determine, for each one of said subsets the wavelength of the signal received in dependence on said first signal portion level and a calibration value,
wherein each subset comprises a second detector element adjacent to said first detector element, for receiving a second signal portion with a second signal portion level, the arrangement being programmed to determine, for each subset, the wavelength of a diffracted signal received in dependence on the difference between said first and second signal portion levels, wherein each subset comprises one or more third detector elements (35a, 35b, 35c, 35d) in between said first and second detector element, for receiving a third signal portion with a third signal portion level, the arrangement being programmed to determine, for each subset, the wavelength of the diffracted signal received in dependence on said first, second and third signal portion levels, and wherein the arrangement is being programmed to determine, for each subset, the wavelength of the diffracted signal received by calculation of the center of gravity of said first, second and third signal portion levels.

24. A computer program product be loaded by a computer arrangement comprising processor means (21) and arranged to receive detector output signals from detector means (8) comprising one or more subsets of detector elements (32, 33, 35, 36, 38, 39), each subset having at least a first detector element for receiving a first signal portion with a first signal portion level of a signal derived from a beam (3) with a spatial uniform intensity distribution, the computer program product, after being loaded by said computer arrangement, providing said computer arrangement with the capability to determine, for each one of said subsets the wavelength of the signal received in dependence on said first signal portion level and a calibration value, wherein each subset comprises a second detector element adjacent to said first detector element, for receiving a second signal portion with a second signal portion level, and wherein said computer arrangement is further provided with the capability to determine, for each subset, the wavelength of a diffracted signal received in dependence on the difference between said first and second signal portion levels, wherein each subset further comprises one or more third detector elements (35a, 35b, 35c, 35d) in between said first and second detector element, for receiving a third signal portion with a third signal portion level, and wherein said computer arrangement is further provided with the capability to determine, for each subset, the wavelength of the diffracted signal received in dependence on said first, second and third signal portion levels, and wherein said computer arrangement is provided with the capability to determine, for each subset, the wavelength of the diffracted signal received by calculation of the center of gravity of said first, second and third signal portion levels.

25. An optical wavelength analyser comprising:

an entrance selector with a slit (4) for receiving a light beam (3) comprising one or more signals each with its own wavelength and passing at least part of said beam (3);

a diffractor (6, 7, 9) to receive said at least part of said beam (3) and to diffract each of said signals at an angle dependent on said wavelength;

a detector (8) comprising one or more pairs of adjacent detector elements (32, 33, 35, 36, 38, 39) arranged to receive said diffracted signals and to generate one or more detector output signals in dependence on the diffracted signals;

a processor (21) connected to said detector (8) for receiving said detector output signals and determining the wavelength of each of said signals characterised in that:

said entrance selector (4) is arranged for receiving a beam with a spatial uniform intensity distribution;

said diffractor (6, 7, 9) is arranged to diffract each of said signals such that each diffracted signal impinges on a different subset of detector elements, each subset comprising at least a first detector element (32; 33; 35; 36; 38; 39) for receiving at least a first signal portion with a first signal portion level;

said processor (21) is arranged to determine, for each subset the wavelength of the diffracted signal received in dependence on the first signal portion level and a calibration value.

26. Optical wavelength analyser according to claim 25, wherein each subset comprises a second detector element adjacent to said first detector element, for receiving a second signal portion with a second signal portion level, and said processor (21) is arranged to determine, for each subset, the wavelength of the diffracted signal received in dependence on the difference between said first and second signal portion levels.

27. An optical wavelength analyser according to claim 26, wherein said processor (21) is arranged to determine, for each one of said subsets of adjacent detector elements (32, 33; 35, 36; 38, 39), the wavelength of the signal received in dependence on the difference between said first and second signal portion levels, the difference being divided by the sum of said first and second portion levels.

28. Optical wavelength analyser according to claim 26, wherein each subset further comprises one or more third detector elements (35a, 35b, 35c, 35d) in between said first and second detector element, for receiving a third signal portion with a third signal portion level, and said processor (21) is arranged to determine, for each subset, the wavelength of the diffracted signal received in dependence on said first, second and third signal portion levels.

29. Optical wavelength analyser according to claim 28, wherein said processor (21) is arranged to determine, for each subset, the wavelength of the diffracted signal received by calculation the center of gravity of said first, second and third signal portion levels.

* * * * *